United States Patent
Morimoto et al.

(10) Patent No.: US 6,862,045 B2
(45) Date of Patent: Mar. 1, 2005

(54) MOVING IMAGE DECODING AND REPRODUCING APPARATUS, MOVING IMAGE DECODING AND REPRODUCING METHOD, TIME CONTROL METHOD, COMPUTER PROGRAM PRODUCT FOR DECODING AND REPRODUCING MOVING IMAGE AND MULTIMEDIA INFORMATION RECEIVING APPARATUS

(75) Inventors: Michiyo Morimoto, Fuchu (JP); Atsushi Asano, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 533 days.

(21) Appl. No.: 09/969,636

(22) Filed: Oct. 4, 2001

(65) Prior Publication Data

US 2002/0041336 A1 Apr. 11, 2002

(30) Foreign Application Priority Data

Oct. 5, 2000 (JP) .................................. 2000-305604

(51) Int. Cl.$^7$ .............................. H04N 7/62; H04N 5/04
(52) U.S. Cl. .................. 348/515; 348/512; 348/516; 348/500; 348/423.1; 370/503; 382/233; 386/109
(58) Field of Search .................. 348/515, 512, 348/500, 518, 423.1, 425.1, 425.4, 407, 516, 507, 510, 523; 382/233, 232, 235; 386/98, 109, 33, 35, 37, 46, 119, 123; 370/506, 512, 503, 510; 375/240.01, 240.25, 240.26, 240.28; 725/32, 36

(56) References Cited

U.S. PATENT DOCUMENTS 5,771,075 A * 6/1998 Rim et al. .................. 348/512
5,815,634 A * 9/1998 Daum et al. .................. 386/96
5,959,684 A * 9/1999 Tan et al. ..................... 348/515
6,016,166 A * 1/2000 Huang et al. ................ 348/515
6,072,832 A * 6/2000 Katto ..................... 375/240.28
6,075,576 A * 6/2000 Tan et al. ................. 348/425.4
6,078,725 A * 6/2000 Tanaka ......................... 386/100
6,088,063 A * 7/2000 Shiba ......................... 348/515
6,141,385 A * 10/2000 Yamaji ................... 375/240.27
6,148,135 A * 11/2000 Suzuki ......................... 386/12
6,363,207 B1 * 3/2002 Duruoz et al. ................ 386/68
6,429,902 B1 * 8/2002 Har-Chen et al. ........... 348/518
6,658,154 B2 * 12/2003 Kohiyama et al. .......... 382/233
6,665,318 B1 * 12/2003 Tomokane et al. .......... 370/535

FOREIGN PATENT DOCUMENTS

JP         9-307891          11/1997

* cited by examiner

Primary Examiner—John Miller
Assistant Examiner—Jean W. Désir
(74) Attorney, Agent, or Firm—Finnegan, Henderson, Farabow, Garrett & Dunner, L.L.P.

(57) ABSTRACT

Moving image signal decoder section decodes the moving image bit stream and the time stamp for reproduction transmitted from multiple separator section on a frame by frame basis and stored in input buffer and provides time control section with the time stamp for reproduction that corresponds to the decoded frame and the information on the time stamp in the header of the moving image bit stream, while storing the decoded image data in frame memory. The time control section transmits a request to image output section for outputting image data at the time specified by the time stamp for reproduction as transmitted from the moving image signal decoder section or at the time as determined on the basis of the time stamp of the moving image itself and causes the image data to be read out of the frame memory and displayed on the LCD.

12 Claims, 5 Drawing Sheets

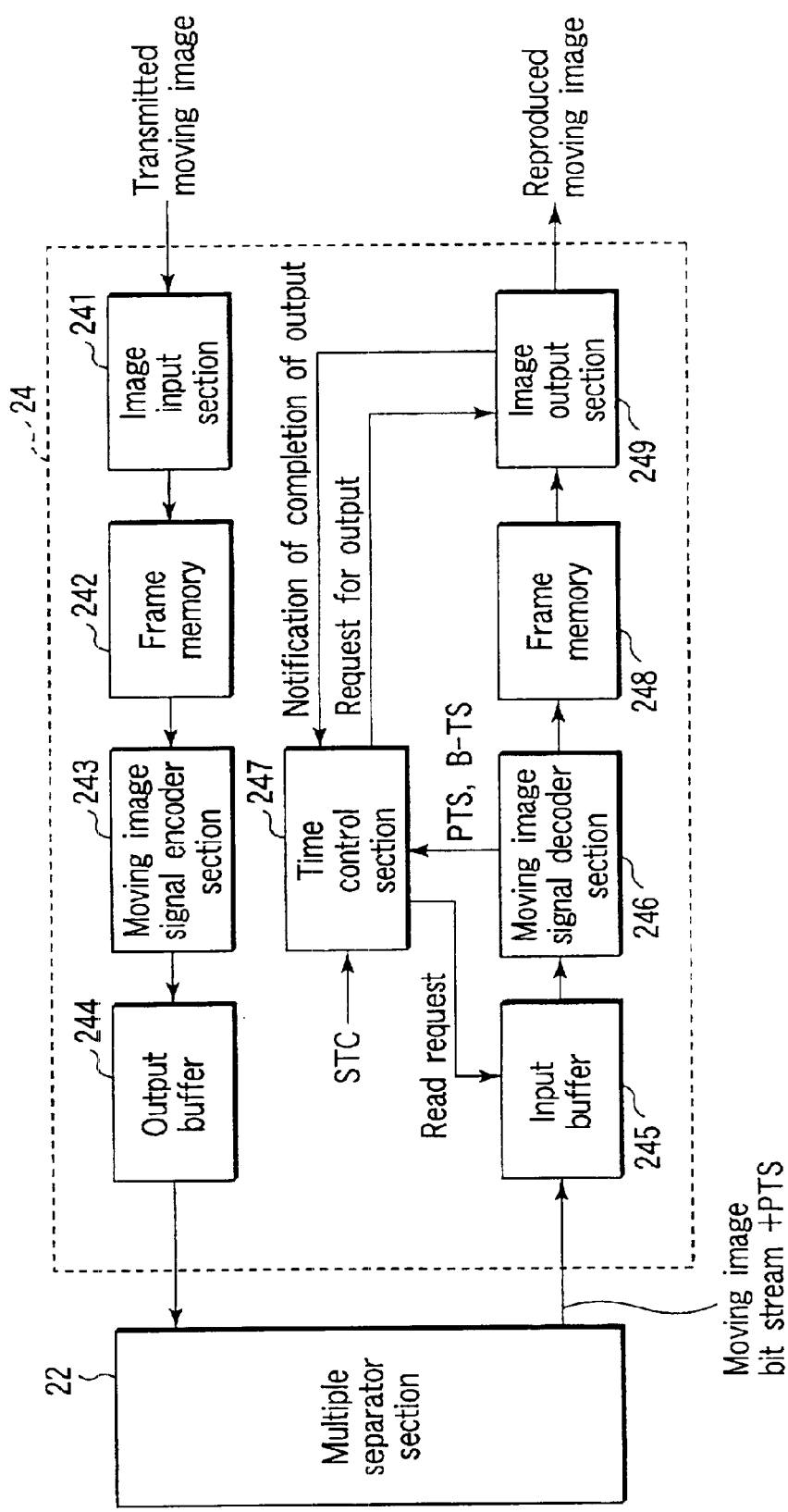
F I G. 2

MOVING IMAGE DECODING AND REPRODUCING APPARATUS, MOVING IMAGE DECODING AND REPRODUCING METHOD, TIME CONTROL METHOD, COMPUTER PROGRAM PRODUCT FOR DECODING AND REPRODUCING MOVING IMAGE AND MULTIMEDIA INFORMATION RECEIVING APPARATUS

CROSS-REFERENCE TO RELATED APPLICATIONS

This application is based upon and claims the benefit of priority from the prior Japanese Patent Application No. 2000-305604, filed Oct. 5, 2000, the entire contents of which are incorporated herein by reference.

BACKGROUND OF THE INVENTION

1. Field of the Invention

This invention relates to a multimedia information receiving apparatus for receiving multimedia information prepared by multiplexing an audio signal and a moving image signal (moving picture signal or video signal) that are related to each other and compressed separately, separating and expanding the audio signal and the moving image signal and reproducing them synchronously. More particularly, the present invention relates to an improvement to a moving image decoding and reproducing apparatus adapted to be used as multimedia information receiving apparatus, a moving image decoding and reproducing method, a time control method and a computer program product for decoding and reproducing a moving image.

2. Description of the Related Art

Generally, in a multimedia information transmission system adapted to transmit multimedia information obtained by multiplexing an audio signal and a moving image signal, the audio encoder and the moving image encoder of the transmitter are required to process respectively the sound and the moving image in a synchronized manner while the audio decoder and the moving image decoder of the receiver are required to process the respective output signals so that the sound and the moving image may be reproduced in a synchronized manner. In order to make it possible to reproduce the sound and the moving image synchronously, the international coding standards such as MPEG-1 and MPEG-2 (MPEG: Moving Pictures Experts Group) provide the use of presentation time stamps (PTSs) as information for controlling the timings of signal outputs so that both the audio signal and the moving image signal are reproduced and output when they are synchronized in the respective decoders at a given time as controlled by a system time clock (STC).

For example, when an audio signal and a moving image signal are multiplexed according to MPEG-2, the bit stream obtained by encoding the audio signal and the moving image signal is divided into groups, which are then packetized to produce packets referred to as PES (packetized elementary stream) packets having a variable length. At this time, a PTS is added to each of the PES packets. If a PES packet contains a moving image bit stream of a plurality of frames, only a PTS corresponding to the first frame is added to the PES packet. In other words, none of the remaining frames are provided with a PTS added thereto.

However, with the moving image encoding method of MPEG-2, there scarcely exists a moving image bit stream of a plurality of frames in a PES packet because the moving image bit stream of a frame is very long. Additionally, since any two consecutive frames are separated from each other by a constant interval, it is possible to accurately estimate the display time of each of the remaining frames from the PTS of the first frame if each and every frame is not provided with PTS.

Meanwhile, the operation of stipulating the MPEG-4 Standards for encoding moving images for the purpose of mobile communications (radio communications) at a low transmission rate is under way. The coming MPEG-4 video coding system will provide the use of a time information added to the header of each VOP (video object plane) frame in a bit stream for the purpose of indicating the time for reproducing the VOP. Note, however, the time information is produced not by using the system time clock but by using a clock whose accuracy is specific to video.

Now, let us assume that the moving image bit stream of a frame is packetized into a single PES packet. If the moving image bit stream of a frame is short, the PES packet will also be short. However, the overhead (the additional data added for the purpose of multiplexing) will become large relative to the packet length because of the addition of a PTS of real data of 33 bits corresponding to the frame in the PES packet. Then, the net result will be a lowered overall transmission efficiency.

Then, it may be conceivable to packetize a moving image bit stream of a plurality of frames into a PES packet and add only a PTS corresponding to the first frame in the PES packet. However, according to MPEG-4, two consecutive frames are not necessarily separated by a constant interval. Then, it will not be possible to accurately estimate the display time of each of the remaining frames because only the first frame in the PES packet is provided with PTS.

As pointed out above, with MPEG-4 for mobile communications at a low transmission rate, if a moving image bit stream is PES packetized on a frame by frame basis and a PTS is added to the frame of each packet, the overhead will become too large relative to the packet length. Additionally, if a moving image bit steam of a plurality of frames is put into a single packet and only a PTS added to the heading frame in the packet, it will no longer be possible to accurately estimate the display time of each of the remaining frames.

BRIEF SUMMARY OF THE INVENTION

In view of the above identified circumstances, it is therefore the project of the present invention to provide a moving image decoding and reproducing apparatus, a moving image decoding and reproducing method, a time control method, a computer program product configured to decode/reproduce a moving image and a multimedia information receiving apparatus that are adapted to reproduce both the moving image and the sound in an accurately synchronized manner even in a situation where a frame has a variable length and a moving image coding system of adding the time control information of the moving image itself is employed to the moving image bit stream of all the frames, while the moving image bit stream is packetized for each frame and then the moving image bit streams of a plurality of frames are collectively packetized.

In an aspect of the invention, there is provided a moving image decoding and reproducing apparatus configured to decode and reproduce moving image packets, the apparatus comprising: a separator configured to receive moving image packets sequentially and separate each of the moving image packets into a first segment or first and second segments of a bit stream and a time stamp, the first bit stream segment relating to the stamp and having a first image signal corresponding to one image frame, and the second bit stream segment having a second frame image signal corresponding to another one image frame and time information relating to the frame image signal; an input buffer configured to store temporarily the first and second bit stream segments and the corresponding time stamps; a decoder configured to read out the first and second bit stream segments sequentially and decode the first and second bit stream segments into the first and second frame image signals, respectively; a memory configured to store the first and second frame image signals supplied from the decoder; an output section configured to output the frame image signals from the memory sequentially; and a controller configured to calculate reproduction timings of outputting the frame image signals from the time stamp and the time information, and control the output of the frame image signals from the output section in accordance with the reproduction timings.

In another aspect of the invention, there is provided a method of decoding and reproducing moving image packets, the method comprising: receiving the moving image packets sequentially and separating each of the moving image packets into a first segment or first and second segments of a bit stream and a time stamp, the first bit stream segment relating to the time stamp and having a first image signal corresponding to one image frame, and the second bit stream segment having a second frame image signal corresponding to another one image frame and having time information relating to the second frame image signal; storing the first and second bit stream segments and the corresponding time stamp, temporarily; reading out the first and second bit stream segments sequentially and decoding the first and second bit stream segments into the first and second frame image signals, respectively; storing the first and second frame image signals; outputting the first and second stored frame image signals sequentially; and calculating, a first reproduction timing of outputting the first frame image signal from the time stamp, and a second reproduction timing of outputting the second frame image signal from the time stamp and the time information, and controlling the output of the first and second frame image signals from the output section in accordance with the first and second reproduction timings.

In still another aspect of the invention, there is provided a method of controlling the reproduction timing of moving image packets, the moving image packet including first and second segments of a bit stream and a time stamp, the first bit stream segment relating to the time stamp and having a second frame image signal corresponding to another one image frame and having time information relating to the second frame image signal; the method comprising: determining a first reproduction timing of outputting the first frame image signal from the time stamp, and a second reproduction timing of outputting the second frame image signal from the time stamp and the time information, and controlling the output of the first and second frame image signals from the output section in accordance with the first and second reproduction timings.

In still another aspect of the invention, there is provided a program product for processing moving image packets, the moving image packet including first and second segments of a bit stream and a time stamp, the first bit stream segment relating to the time stamp and having a first image signal corresponding to one image frame, and the second bit stream segment having a second frame image signal corresponding to another one image frame and having time information relating to the second frame image signal; the program product comprising: a program code for determining a first reproduction timing of outputting the first frame image signal from the time stamp, and a second reproduction timing of outputting the second frame image signal from the time stamp and the time information, and controlling the output of the first and second frame image signals, respectively; storing the first and second frame image signals; outputting the first and second stored frame image signals sequentially; and calculating a first reproduction timing of outputting the first frame image signal from the time stamp, and a second timing of outputting the second frame image signal from the time stamp and the time information, and controlling the output of the first and second frame image signals from the output section in accordance with the first and second reproduction timings.

In a further aspect of the invention, there is provided a multimedia information receiving apparatus to be used in a system configured to transmit the multimedia information formed by packetizing and multiplexing the moving image bit stream and the sound bit stream obtained by encoding a moving image signal and a sound signal related to each other on a frame by frame basis; each moving image packet of the multimedia information being formed by adding time information to be used for reproducing to the frame header of the moving image bit stream, packetizing the moving image bit stream for every one or more than one frames and adding time stamp to be used for reproduction to each packet of the bit stream of one or more than one frames in order to synchronize the moving image signal and the sound signal for reproduction; the apparatus comprising; a separator configured to separate the moving image bit stream, the sound bit stream and the time stamps to be used for reproduction corresponding respectively to the moving image bit stream and the sound bit stream; a sound decoder and reproducer configured to decode the sound bit stream as separated by the separator, and reproduce and output the decoded sound signal on the basis of the time stamp to be used for sound reproduction; and a moving image decoder and reproducer configured to decode the moving image bit stream as separated by the separator, to receive the time stamp to be used for reproduction as separated by the separator and to output, for the moving image bit stream of each frame having the time stamp added thereto, the decoded moving image signal at the time of reproduction as specified by the time stamp and, for the moving image bit stream of each frame having no time stamp as added thereto, the decoded moving image signal at the time of reproduction as determined on the basis of the time stamp as detected prior to that frame and the time information to be used for reproducing as added to the header of the moving image bit stream of the frame.

By providing such a moving image decoding and reproducing apparatus, a moving image decoding and reproducing method, a time control method and a computer program product for decoding and reproducing a moving image, it is now possible to reproduce both the moving image and the sound in an accurately synchronized manner even in a situation where the moving image bit stream of a frame has a variable length and a moving image coding system of adding the time control information to be mainly used for reproducing of the moving image itself is employed to the moving image bit stream of all the frames, while the moving image bit stream is packetized for each frame and then the moving image bit streams of are plurality of frames a collectively packetized.

Additionally by providing such a multimedia information receiving apparatus, it is now possible to reproduce both the moving image and the sound in an accurately synchronized manner even in a situation where the packets of given multimedia information contains a moving image bit stream and the moving image bit stream of a frame has a variable length, a moving image coding system of adding the time control information to be mainly used for reproducing of the moving image itself being employed to the moving image bit stream of all the frames, while the moving image bit stream is packetized for each frame and then the moving image bit streams of a plurality of frames are collectively packetized.

The time of reproduction is controlled by the reference time of the system. Then, the signal to be reproduced can be synchronized with another signal to be reproduced.

When time control information to be used for reproduction corresponding to a plurality of frames is added to the packet, the decoded moving image signal of the frame to which the time control signal to be used for reproduction is added will be selectively output. Then, the frame to which time control information to be used for reproduction is added can be randomly accessed.

In other words, when a moving image coding system conforming to MPEG-4 is used, the fact that a time stamp for reproducing is added to the header of the moving image bit stream will be utilized. Thus, if a time stamp to be used for reproduction is added to a system packet on a frame-by-frame basis, the time stamp is used as reproduction time information. On the other hand, if a time stamp to be used for reproduction is not added to a system packet, the time stamp to be used for reproducing as added to the frame header of the moving image bit stream is used as reproduction time information.

Additional objects and advantages of the invention will be set forth in the description which follows, and in part will be obvious from the description, or may be learned by practice of the invention. The objects and advantages of the invention may be realized and obtained by means of the instrumentalities and the combinations particularly pointed out hereinafter.

BRIEF DESCRIPTION OF THE SEVERAL VIEWS OF THE DRAWING

The accompanying drawing, which is incorporated in and constitutes a part of the specification, illustrates embodiments of the invention, and together with the general description given above and the detailed description of the embodiments given below, serve to explain the principles of the invention.

FIG. 2 is a schematic block diagram of the image processor section of the embodiment of FIG. 1;

DETAILED DESCRIPTION OF THE INVENTION

Now, the present invention will be described by referring to the accompanying drawing that illustrates preferred embodiments of the invention.

Figure 1:
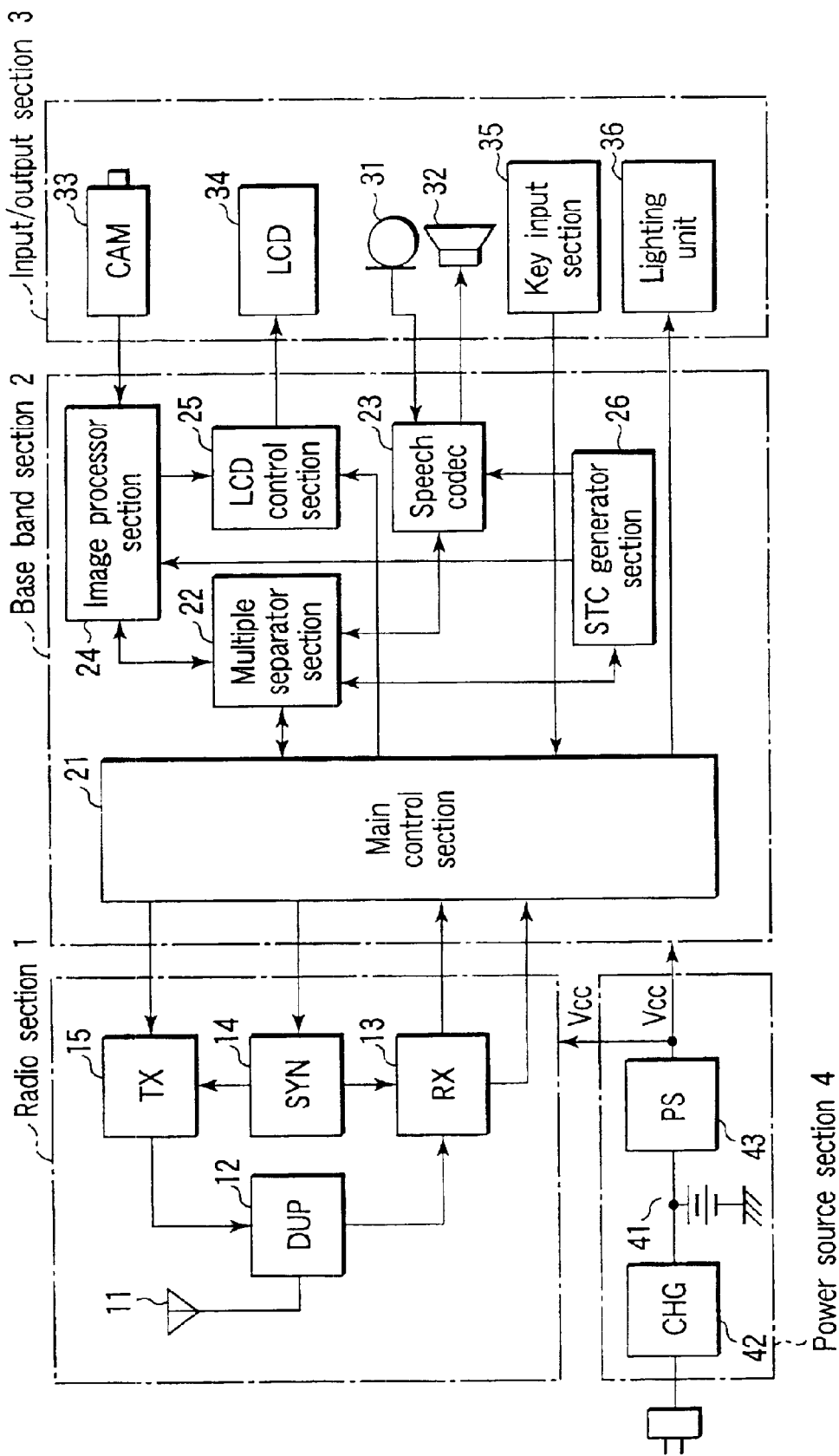
FIG. 1 is a schematic block diagram of multimedia information receiving apparatus according to the embodiment, illustrating the entire configuration thereof, as applied to a mobile communication terminal.

FIG. 1 is a schematic block diagram of an embodiment of multimedia information receiving apparatus according to the invention, illustrating the entire configuration thereof, as applied to a mobile communication terminal such as cellular telephone. The mobile communication terminal comprises a radio section 1, a base band section 2, an input/output section 3 and a power source section 4. The multimedia information transmitted by this system has a format conforming to the MPEG-4 Standard.

Referring to FIG. 1, the radio frequency signal getting to the mobile communication terminal from a base station (not shown) by way of a radio line of the mobile communication system is received by antenna 11 and then fed to reception circuit (RX) 13 by way of an antenna duplexer (DUP) 12. The reception circuit 13 comprises a high frequency amplifier, a frequency converter and a demodulator. The received radio frequency signal is subjected to low noise amplification by a low noise amplifier and then mixed with a reception local oscillation signal generated by frequency synthesizer (SYN) 14 in the frequency converter for a frequency conversion that turns the radio frequency signal into a reception intermediate frequency signal or a reception base band signal. The output signal is then digitally demodulated by the demodulator. An orthogonal demodulation method corresponding to the QPSK method may typically be used for the demodulation. The frequency of the reception local oscillation signal generated by the frequency synthesizer 14 is specified by the main control section 21 provided in the base band section 2.

The demodulated signal output from the reception circuit 13 is then input to the base band section 2. The base band section 2 comprises a main control section 21, a multiple separator section 22, a speech coder/decoder (to be referred to as codec hereinafter) 23, an image processor section 24, an LCD (liquid crystal display) control section 25 and an STC (system time clock) generator section 26. The STC is the reference clock in the receiver side and may typically be a clock with a frequency of 27 MHz and synchronized with the counterpart of the transmitter side by phase regulation.

The main control section 21 identifies the demodulated signal fed from the reception circuit 13 to find out if it is control information or multimedia information. If it is found to be multimedia information, the main control section 21 forwards the signal to the multiple separator section 22, which separates the input multimedia information into a sound data packet and an image data packet.

The sound data packet is then supplied to the speech codec 23. Upon decoding the sound signal in the input sound data packet, the speech codec 23 transmits the sound signal at a timing that is determined by the STC fed from the STC generator section 26 and the PTS added to the sound data packet. The sound signal output from the speech codec 23 is fed to a loudspeaker 32 of the input/output section 3 and the original sound is acoustically reproduced from the loudspeaker 32.

On the other hand, the image data packet is supplied to the image processor section 24. Upon decoding the image signal in the input image data packet, the image processor section 24 transmits the image signal at a timing that is determined by the STC fed from the STC generator section 26 and the PTS added to the image data packet. The image signal output from the image processor section 24 is fed to a LCD 34 of the input/output section 3 by way of the LCD control section 25 and the original image is displayed on the display screen of the LCD 34.

The LCD control section 25 has the function of displaying various pieces of information on the operation of the apparatus as output from the main control section 21 including a telephone directory, the detected intensity of the received electric field and the remaining charge on the battery on the LCD 34.

The speech signal of the user output from the microphone 31 of the input/output section 3 is input to the speech codec 23 of the base band section 2 and coded there before fed to the multiple separator section 22. On the other hand, the image signal output from the camera (CAM) 33 is supplied to the image processor section 24 of the base band section 2 and coded there according to MPEG-4 before fed to the multiple separator section 22. The multiple separator section 22 multiplexes the coded speech data and the coded image data in a predetermined format defined in the MPEG-2 system and generates a base band transmission data. The multiplexed transmission data is the fed to the transmission circuit (TX) 15 of the radio section 1 from the main control section 21.

The transmission circuit 15 comprises a modulator, a frequency converter and a transmission power amplifier. The transmission data is digitally modulated by the modulator and mixed with the transmission local oscillation signal generated by the frequency synthesizer 14 in the frequency converter for a frequency conversion that turns the data into a radio frequency signal. The QPSK method may typically be used for the modulation. The generated transmission radio frequency signal is then amplified to a predetermined transmission level and supplied to the antenna 11 by way of the antenna duplexer 12, which antenna 11 transmits the signal to the base station (not shown).

The power source section 4 comprises a battery 41 such as a lithium ion battery, a charging circuit 42 for electrically charging the battery 41 and a voltage generation circuit (PS) 43. The voltage generation circuit 43 typically comprises a DC/DC converter and generates a predetermined supply voltage Vcc according to the output voltage of the battery 41.

The input/output section 4 is provided with a lighting unit 36 for lighting the LCD 34 and the key input section 35 at the time of user operation and communication. The lighting unit 36 is also referred to as backlight or illumination.

The main control section 21 comprises a micro-computer and an internal memory that may include a ROM and a RAM. It has an ordinary control feature of controlling the connection of radio channels established by using appropriate ones of the above components and also controlling the communication that takes place after the establishment of a communication link.

FIG. 2 is a schematic block diagram of the image processor section 24 of the embodiment of FIG. 1.

Referring to FIG. 2, the moving image signal output from the camera 33 is digitized by the image input section 241 and then stored in the frame memory 242. The moving image signal encoder section 243 compresses and encodes the moving image data stored in the frame memory 242 by means of the moving image coding method of MPEG-4 and generates a moving image bit stream, adding a time information to each frame as header information. The moving image bit stream output from the moving image encoder section 243 is then fed to the multiple separator section 22 by way of the output buffer 244 and multiplexed with the speech bit stream of the speech that is input by way of the microphone and encoded by the speech codec 23. Then, the multiplexed signals are transmitted as multimedia information.

The multiple separator section 22 is adapted to packetize the signal input to it on a frame-by-frame basis or by a plurality of frames to generate PES packets. At this time, a time stamp (PTS) to be used for reproduction that is synchronized with the sound is added to each PES packet. PES packets may be formed from the moving image bit stream on a VOP (frame) by VOP (frame) basis or by a plurality of VOP frames.

The multiple separator section 22 converts the PES packets into TS packets having a fixed length. A PCR (program clock reference) is added to the head of each TS packet in order to synchronize the system clock of the transmitter side and that of the receiver side.

As the multimedia information that is generated in a manner as described above is received, the multiple separator section 22 restores the PES packets from the received TS packets and separates the sound bit stream and the moving image bit stream from each of the PES packets. Then, it transmits the sound bit stream to the speech codec 23 to reproduce the original sound from the loudspeaker 32 while it sends out the moving image bit stream to the image processor section 24. At this time, the time stamp (PTS) that has been added to the PES packet is then added to the moving image bit stream.

Figures 3A, 3B, 3C:
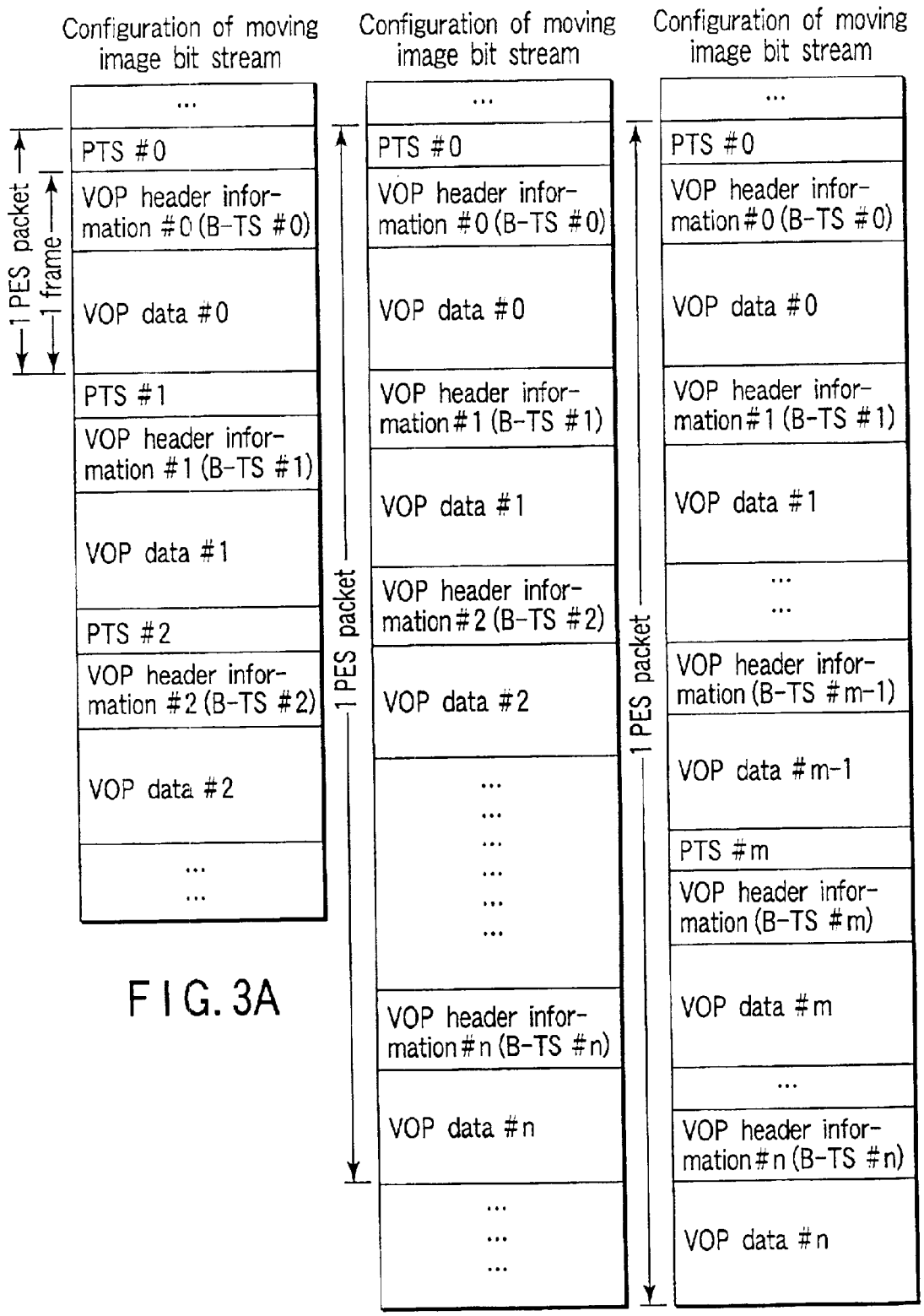
FIGS. 3A, 3B and 3C are schematic illustrations of three different moving image bit streams that can be used for the purpose of the embodiment, illustrating three different methods to be used by the multiplexer/separator section of FIG. 1 for adding a time stamp to be used for reproduction to a moving image bit stream when generating a PES packet.

A time stamp (PTS) may be added to the head of each and every piece of VOP header information (VOP stamp code) as shown in FIG. 3A when the moving image bit stream is packetized into PES packets on a frame-by-frame basis. Alternatively, a time stamp (PTS) may be added only to the head of the leading piece of VOP header information as shown in FIG. 3B when the moving image bit stream of n frames is collectively packetized into a PES packet. Still alternatively, a time stamp (PTS) may be added to the head of every intermediary piece of VOP header information as shown in FIG. 3C. It should be noted that, in FIGS. 3A, 3B and 3C, a VOP data refers to the moving image bit stream of a frame.

The multiple separator section 22 forwards the PCR of the TS packet it receives to the STC generator section 26. The STC generator section 26 corrects its own clock so as to be synchronized with that of the transmitter side on the basis of the PCR it receives and sends it to the speech codec 23 and the image processor section 24 so that it may be referred to for synchronized reproduction.

The image processor section 24 stores the moving image bit stream and the time stamp (PTS) it receives from the multiple separator section 22 in the input buffer 245. Then, the moving image signal decoder section 246 decodes the moving image bit stream and the time stamp (PTS) stored in the input buffer 245 and provides the time control section 247 with the time stamp (PTS) and the time information indicating the time of reproduction as contained in the header information of the moving image bit stream corresponding to the decoded frame, while it stores the decoded image data in the frame memory 248.

The STC corrected by the SCR provided by the multiple separator section 22 is then given to the time control section 247. The time control section 247 transmits a request for providing an image data to the image output section 249 at the time when the STC comes to agree with the time stamp (PTS) for reproduction from the moving image signal decoder section 246 or when the time corresponding to the one indicated by the time information of the moving image itself has elapsed.

Upon receiving the request for outputting an image data from the time control section 247, the image output section 249 reads out the image data from the frame memory 248 and causes the LCD 34 to display the image data by way of the LCD control section 25. Then, it transmits a notification of completion of the output to the time control section 247. Upon receiving the notification of completion of the output from the image output section 249, the time control section 247 transmits a reading request to the input buffer 245 in order to cause the moving image signal decoder section 246 to start decoding the next frame.

Figure 4:
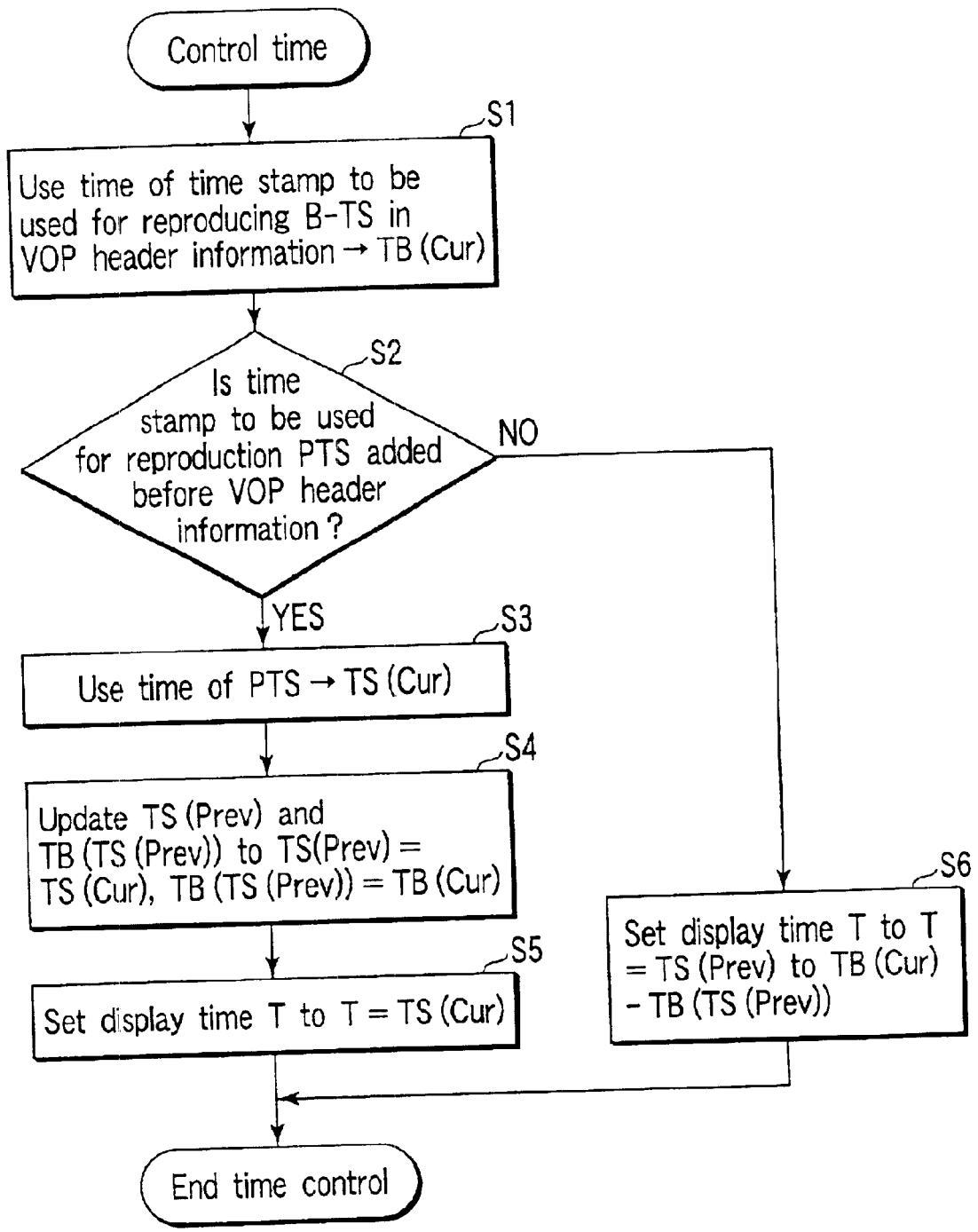
FIG. 4 is a flow chart of the processing operation of the time control section of FIG. 1 for determining the time of displaying the image represented by a moving image signal.

FIG. 4 is a flow chart of the processing operation of the time control section 247 for controlling the time of displaying a frame. Note that, in the below description, B-TS is a time information that indicates the time of reproduction as contained in the VOP header information of the moving image bit stream. In addition, TB (cur) is the time determined on the basis of the B-TS corresponding to the current VOP. On the other hand, TS (cur) is a time information that indicates the time determined on the basis of the time stamp (PTS) that indicates the time of reproduction acquired from a PES packet and corresponds to the current VOP. Although the B-TS always exists corresponding to each of the VOP, the PTS does not always exists corresponding to each of the VOP. Therefore, the time notion "TS (prev) and TB (TS (prev))" are introduced. The TS (prev) is the time determined on the basis of the previous PTS and the TB (TS (prev)) is the time determined on the basis of B-TS of VOP corresponding to the previous PTS.

Referring to FIG. 4, firstly, it determines the time TB (Cur) to be referred to for the current frame on the basis of the time information to be used for reproducing B-TS that is contained in the VOP header information (Step S1). Then, it determines if a time stamp to be used for reproduction (PTS) is added to the head of the VOP header information or not (Step S2).

If it is determined in Step S2 that a time stamp to be used for reproduction (PTS) is added (Yes), the time control section 247 determines the time of reproduction of the current frame TS (Cur) from the time stamp to be used for reproduction (PTS) (Step S3) and updates the time of reproduction of the preceding frame (Prev) and the reference time TB (TS (Prev)) (TS (Prev)=TS (Cur)), TB (TS (Prev)= TB (Cur)) (Step S4). Subsequently, the time control section 247 sets the display time to T=TS (Cur) and terminates the sequence of time control operation. If, on the other hand, it is determined in Step S2 that a time stamp to be used for reproduction (PTS) is not added (No), the time control section 247 sets the display time to T=TS (Prev)+TB (Cur)− TB (TS (Prev)) and terminates the sequence of time control operation.

The moving image reproducing operation of the image processor section 24 having the above described configuration will now be described by way of the first through third embodiments.

Figure 5:
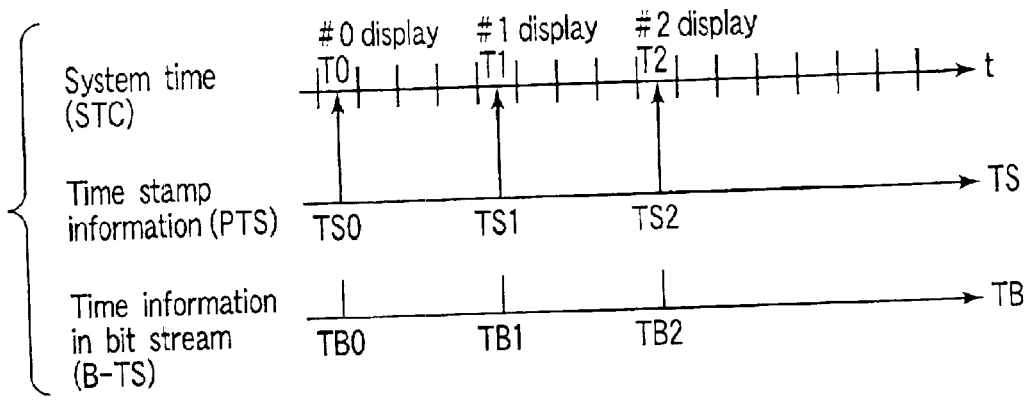
FIG. 5 is a timing chart for outputting image data, illustrating the first embodiment of moving image reproducing operation.

As the first embodiment, assume that PES packets are formed on a frame by frame basis and a time stamp (PTS) is added to the head of each and every piece of VOP header information (VOP start code) as shown in FIG. 3A. FIG. 5 is a timing chart for outputting image data, illustrating the first embodiment of moving image reproducing operation.

Also assume that the time stamps added to the PES packets are PTS #0, PTS #2, PTS #1, . . . and the times of reproduction provided by them are respectively TS0, TS1, . . . With this arrangement, all the frames are provided with respective time stamps (PTS) so that the image of the frame #0 is displayed when the time t as indicated by the system clock (STC) is t≧TS0 (=T0), the image of the frame #1 is displayed when the time t as indicated by the system clock (STC) is t≧TS1 (=T1), and so on.

Figure 6:
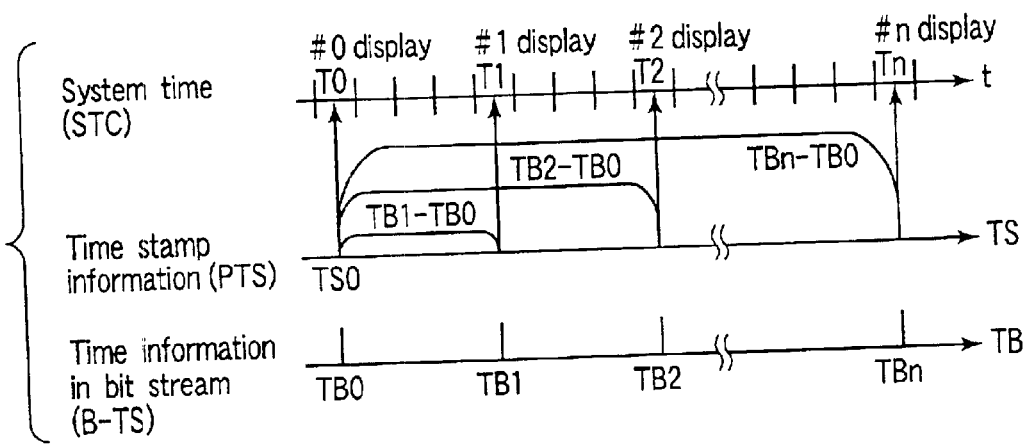
FIG. 6 is a timing chart for outputting image data, illustrating the second embodiment of moving image reproducing operation.

As the second embodiment, assume a PES packet is formed for n frames and a time stamp (PTS) is added only to the head of first piece of VOP header information as shown in FIG. 3B. FIG. 6 is a timing chart for outputting image data, illustrating the second embodiment of moving image reproducing operation.

Also assume that the time of the time stamp to be used for reproduction PTS #0 as added to the VOP header information of the leading frame #0 is TS0, that of the time information B-TS #0 contained in the VOP header information of the frame #0 is TB0, that of the time information B-TS #1 contained in the VOP header information of the frame #1 is TB1 and so on.

With this arrangement, firstly, as the time stamp PTS #1 for determining the time of reproduction TS0 of the frame #0 is provided, the image of the frame #1 is displayed when the reference time t becomes t≧TS0 (=T0). Then, since the time stamp PTS for determining the time of reproduction of the frame #1 is not provided, the time information B-TS #1 to be used for reproduction as contained in the VOP header information of the frame #1 is utilized. Thus, the time of display T1 of the frame #1 is determined by equation $$T1=TS0+(TB1-TB0)$$

and the image of the frame #1 is displayed at the time when t≧T1 holds true. A similar procedure is followed subsequently. If the time of the time information B-TS #n to be used for reproduction as contained in the VOP header information of the frame #n is TBn, the time Tn (n being an integer satisfying n≧1) at which the image of the frame #n is displayed is determined by equation $$Tn=TS0+(TBn-TB0)$$

and the image of the frame #n is displayed at the time when t≧Tn holds true.

In the case of this embodiment, since it is safe to assume that TS0 is the initial delay time for displaying the moving image, it is possible to accurately define the initial delay time in a system for synchronously multiplexing an audio signal and a moving image signal.

Finally, as the third embodiment, assume a PES packet is formed for n frames and a time stamp (PTS) is added not only to the head of first piece of VOP header information but also to the head of intermediary pieces of VOP header information as shown in FIG. 3C. Note that a time stamp (PTS) may be added to the head of intermediary pieces of VOP header information at regular time intervals such as every 2 seconds or to the head of the piece of VOP header information of I picture (I-VOP). According to MPEG-4, a moving image bit stream comprises a part referred to as configuration information (CI) and a part referred to as elementary stream (ES) and one or more than one pieces of CI are provided for every ES, although a piece of CI may be inserted to a moving image bit stream many times. Therefore, a time stamp (PTS) may alternatively be added to the head of a piece of VOP header information located immediately after an inserted piece of CI.

Figure 7:
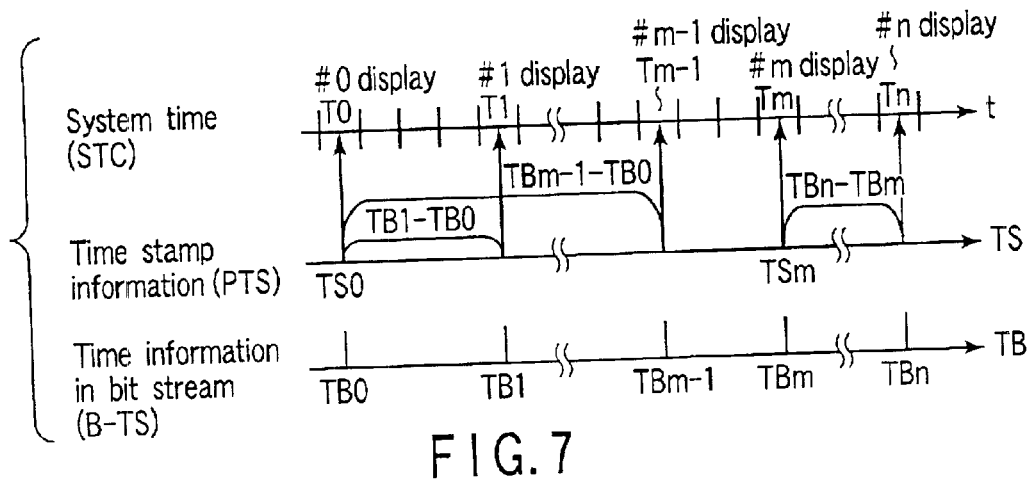
FIG. 7 is a timing chart for outputting image data, illustrating the third embodiment of moving image reproducing operation.

FIG. 7 is a timing chart for outputting image data, illustrating the third embodiment of moving image reproducing operation. Also assume here that, like the second embodiment, the time stamp (PTS0) is added to the frame #0 and the time information (TSm) is added to the head of the piece of VOP header information of the frame #m (m being an integer satisfying 1<m<n), the following equations hold true;

$$Tm-1=TS0+(TBm-1-TB0),$$

$$Tm=TSm \text{ and}$$

$$Tn=TSm+(TBn-TBm),$$

where Tm−1, Tm and Tn respectively represent the time at which the image of the frame #m−1 is displayed, the time at which the image of the frame #m is displayed and the time at which the image of the frame #n is displayed. Then, in the frame #m−1, the display time is computed by referring to the time TS0 of the time stamp to be used for reproduction PTS #0 of the frame #0 and the time TBm−1 of the time information to be used reproducing as contained in the piece of VOP header information of the frame #m−1 and the image is displayed when t≧Tm−1 holds true. In the frame #m, the time TSm of the time stamp to be used for reproduction PTS #m is used so that the image of the frame #m is displayed when t≧Tm holds true. Then, in the frame #n, the display time is computed by referring to the time stamp to be used for reproduction PTS m of the frame #m and the time TBn indicated by the time information in the piece of VOP header information of the frame #n and the image of the frame #n is displayed when t≧Tn holds true.

In the case of this embodiment, time stamp errors can occur in the moving image bit stream and images can be displayed according to wrong pieces of time information particularly if signals are transmitted by way of a low quality transmission path such as that of a mobile communication system (radio communication system). However, wrong pieces of time information are replaced by highly reliable pieces of time information of the system as the time stamps to be used for reproduction (PTS) that are added to intermediary parts of a PES packet are used on a priority basis.

Additionally, when a presentation time stamp to be used for reproduction (PTS) is inserted between two frames in such a manner that time stamps (PTS) are added for frames in a packet, respectively, as in the case of this embodiment, it may be so arranged that the time stamps to be used for reproduction (PTS) are retrieved and one of the retrieved time stamps that is added for the frame of the moving image signal is selectively used to start outputting the reproduced signal. With this arrangement, the frame to which the time stamp to be used for reproduction (PTS) is added can be randomly accessed.

In this random access operation, a selective output mode can be set on the key input section 35. When the key input section 35 is depressed to set the selective output mode, a selective mode signal is generated in the key input section 35 and is supplied to the main control section 21 to set the main control section 21. Thus, the main control section 21 sets the time control section 247 in the selective output mode and the time control section 247 controls the output section 249. That is, the time control section 247 determines selective output timings of the frame image signals in the output section 249 in accordance with the time stamps so that the frame image signals that are provided with the time stamps (PTS) as described above are selectively output from the output section 249 in accordance with the output timings.

Thus, the image processor section 24 of the above embodiment determines if a time stamp to be used for reproduction (PTS) is added to the moving image bit stream on a frame by frame basis or not in the process of decoding and reproducing the image signal and, if it is found that time stamps to be used for reproduction (PTS) are added to the moving image bit stream on a frame by frame basis, it uses not the time information added to the header information of the moving image bit stream but the time stamps to be used for reproduction (PTS) as reproduction time information. On the other hand, if it is found that time stamps to be used for reproduction (PTS) are not added to the moving image bit stream on a frame by frame basis, it obtain reproduction time information for the frames, using the time information added to the header information of the moving image bit stream. Therefore, it is now no longer necessary to assign a time stamp to each and every frame so that the overhead of each frame of a moving image signal can be reduced. Additionally, the present invention provide an effect of making it possible to randomly access the frame that is adapted to establish the initial delay time and to which a time stamp to be used for reproduction (PTS) is added.

While the present invention is applied to the image processor section of a mobile communication terminal in the above embodiment, the present invention is by no means limited thereto. In other words, the present invention can be applied to a receiving apparatus of a multimedia information transmission system conforming to MPEG-4 or similar standards.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A moving image decoding and reproducing apparatus configured to decode and reproduce moving image packets, the apparatus comprising:

a separator configured to receive moving image packets sequentially and separate each of the moving image packets into a first segment or first and second segments of a bit stream and a time stamp, the first bit stream segment relating to the stamp and having a first image signal corresponding to one image frame, and the second bit stream segment having a second frame image signal corresponding to another one image frame and time information relating to the frame image signal;

an input buffer configured to store temporarily the first and second bit stream segments and the corresponding time stamps;

a decoder configured to read out the first and second bit stream segments sequentially and decode the first and second bit stream segments into the first and second frame image signals, respectively;

a memory configured to store the first and second frame image signals supplied from the decoder;

an output section configured to output the frame image signals from the memory sequentially; and a controller configured to calculate reproduction timings of outputting the frame image signals from the time stamp and the time information contained in a header of the second bit stream, and control the output of the frame image signals from the output section in accordance with the reproduction timings.

2. The apparatus according to claim 1, further comprising;
a timer configured to generate a reference timing signal; wherein said controller controls the output section with reference to the reference timing signal.

3. The apparatus according to claim 1, further comprising;
an input section configured to set a predetermined output mode to select outputs of the frame image signals;
wherein said controller is configured to set said output section in response to the predetermined output mode to determine selective output timings corresponding to the time stamp, and control the output of the frame image signals from the output section in accordance with the selective output timings.

4. A method of decoding and reproducing moving image packets, said method comprising:
receiving the moving image packets sequentially and separating each of the moving image packets into a first segment or first and second segments of a bit stream and a time stamp, the first bit stream segment relating to the time stamp and having a first image signal corresponding to one image frame, and the second bit stream segment having a second frame image signal corresponding to another one image frame and having time information relating to the second frame image signal;
storing the first and second bit stream segments and the corresponding time stamp, temporarily;
reading out the first and second bit stream segments sequentially and decoding the first and second bit stream segments into the first and second frame image signals, respectively;
storing the first and second frame image signals;
outputting the first and second stored frame image signals sequentially; and
calculating, a first reproduction timing of outputting the first frame image signal from the time stamp, and a second reproduction timing of outputting the second frame image signal from the time stamp and the time information contained in a header of the second bit stream, and controlling the output of the first and second frame image signals from the output section in accordance with the first and second reproduction timings.

5. A method of controlling the reproduction timing of moving image packets, said moving image packet including first and second segments of a bit stream and a time stamp, the first bit stream segment relating to the time stamp and having a second frame image signal corresponding to another one image frame and having time information; said method comprising:
determining a first reproduction timing of outputting the first frame image signal from the time stamp, and a second reproduction timing of outputting the second frame image signal from the time stamp and the time information contained in a header of the second bit stream, and
controlling the output of the first and second frame image signals from the output section in accordance with the first and second reproduction timings.

6. The method of claim 5, wherein the time information contained in the header of the second bit stream is not a time stamp.

7. A program product for processing moving image packets, said moving image packet including first and second segments of a bit stream and a time stamp, the first bit stream segment relating to the time stamp and having a first image signal corresponding to one image frame, and the second bit stream segment having a second frame image signal corresponding to another one image frame and having time information; said program product comprising:
a program code for determining a first reproduction timing of outputting the first frame image signal from the time stamp, and a second reproduction timing of outputting the second frame image signal from the time stamp and the time information contained in a header of the second bit stream, and
controlling the output of the first and second frame image signals, respectively;
storing the first and second frame image signals;
outputting the first and second stored frame image signals sequentially; and
calculating a first reproduction timing of outputting the first frame image signal from the time stamp, and a second timing of outputting the second frame image signal from the time stamp and the time information, and controlling the output of the first and second frame image signals from the output section in accordance with the first and second reproduction timings.

8. The program product of claim 7, wherein the time information contained in the header of the second bit stream is not a time stamp.

9. A multimedia information receiving apparatus to be used in a system configured to transmit the multimedia information formed by packetizing and multiplexing the moving image bit stream and the sound bit stream obtained by encoding a moving image signal and a sound signal related to each other on a frame by frame basis;
each moving image packet of said multimedia information being formed by adding time information to be used for reproducing to the frame header of said moving image bit stream, packetizing the moving image bit stream for every one or more than one frames and adding time stamp to be used for reproduction to each packet of the bit stream of one or more than one frames in order to synchronize the moving image signal and the sound signal for reproduction; said apparatus comprising;
a separator configured to separate the moving image bit stream, the sound bit stream and the time stamps to be used for reproduction corresponding respectively to the moving image bit stream and the sound bit stream;
a sound decoder and reproducer configured to decode the sound bit stream as separated by said separator, and reproduce and output the decoded sound signal on the basis of the time stamp to be used for sound reproduction; and
a moving image decoder and reproducer configured to decode the moving image bit stream as separated by said separator, to receive the time stamp to be used for reproduction as separated by said separator and to output, for the moving image bit stream of each frame having the time stamp added thereto, the decoded moving image signal at the time of reproduction as specified by said time stamp and, for the moving image bit stream of each frame having no time stamp as added thereto, the decoded moving image signal at the time of reproduction as determined on the basis of the time stamp as detected prior to that frame and the time information to be used for reproducing as added to said header of the moving image bit stream of the frame.

10. The apparatus according to claim 9, wherein said moving image decoder and reproducer includes:

an input buffer configured to store temporarily the moving image bit stream and the time stamp to be used for reproduction as separated by said separator;

a moving image signal decoder configured to read out the moving image bit stream from the input buffer on a frame by frame basis and decode the moving image bit stream at the time specified by the time information to be used for reproducing as added to the frame header of each frame;

a frame memory configured to store moving image signals corresponding to each frame decoded by said moving image signal decoder;

an image output section configured to output the moving image signal stored in the frame memory according to the instruction for reproduction; and a time controller configured to receive the time information to be used for reproducing as obtained by said moving image signal decoder and the time stamp to be used for reproduction as obtained by said separator as input and direct, with respect to the frame having time stamp as added thereto, said moving image output section to output the corresponding moving image signal at the reproduction time as specified by the information and, with respect to the frame having no time stamp as added thereto, said moving image output section to output the corresponding moving image signal at the reproduction time as determined from the time stamp added to the preceding frames and the time information of the frame.

11. The apparatus according to claim 10, wherein said time controller controls the reproduction time on the basis of the reference time of the system transmitting the multimedia information.

12. The apparatus according to claim 10, wherein when the time stamp to be used for reproduction is added to the moving image bit stream of a plurality of frames in said moving image packet, said image output section selectively outputs the decoded moving image signal of the frame having the time stamp.

* * * * *